United States Patent [19]

Cohen et al.

[11] Patent Number: 4,946,816
[45] Date of Patent: Aug. 7, 1990

[54] MORPHOLOGY-CONTROLLED OLEFIN POLYMERIZATION CATALYST

[75] Inventors: Steven A. Cohen; Gregory G. Arzoumanidis; Nicholas M. Karayannis; Habet M. Khelghatian, all of Naperville; Sam S. Lee, Hoffman Estates, all of Ill.

[73] Assignee: Amoco Corporation, Chicago, Ill.

[21] Appl. No.: 395,990

[22] Filed: Aug. 21, 1989

[51] Int. Cl.$^5$ .................................................. C08F 4/64
[52] U.S. Cl. ..................................... 502/126; 502/118; 502/121; 502/122; 502/123; 502/124; 502/125; 502/127; 502/133
[58] Field of Search ............... 502/118, 121, 122, 123, 502/124, 125, 126, 127, 133

[56] References Cited

U.S. PATENT DOCUMENTS

| | | | |
|---|---|---|---|
| 4,540,679 | 9/1985 | Arzoumanidis et al. | 502/133 X |
| 4,612,299 | 9/1986 | Arzoumanidis et al. | 502/133 X |
| 4,866,022 | 9/1989 | Arzoumanidis et al. | 502/125 X |

*Primary Examiner*—Patrick P. Garvin
*Attorney, Agent, or Firm*—Wallace L. Oliver; William H. Magidson; Ralph C. Medhurst

[57] ABSTRACT

In a solid hydrocarbon-insoluble, alpha-olefin polymerization catalyst component with superior activity, stereospecificity and morphology characteristics comprising the product formed by (A) forming a solution of a magnesium-containing species from a magnesium alkyl (or hydrocarbyl) carbonate or a magnesium carboxylate; (B) precipitating solid particles from such magnesium-containing toluene-based solvent by treatment with a transition metal halide and an organosilane; (C) re-precipitating such solid particles from a mixture containing a cyclic either; and (D) treating the re-precipitated particles with a transition metal compound and an electron donor, the morphology of such component is modified by incorporating a morphology-affecting amount of $C_8$–$C_{10}$ aromatics within the toluene-based solvent in Step B, Step A, in Step C prior to addition of ether, or combinations thereof.

20 Claims, No Drawings

MORPHOLOGY-CONTROLLED OLEFIN POLYMERIZATION CATALYST

BACKGROUND OF THE INVENTION

This invention relates to catalyst systems useful for polymerizing alpha-olefins and particularly relates to a supported titanium halide catalyst component and a catalyst system containing such component and more particularly to a solid catalyst component which can be modified to yield varying particle morphologies.

Magnesium-containing supported titanium halide-based alpha-olefin polymerization catalyst components are now well known in the art. Typically, these catalysts are recognized for their performance based on activity and stereospecificity. However, commercial olefin polymerization, especially gas-phase alpha-olefin polymerization, requires additional catalyst attributes for economical large-scale operation. Specifically, polymer morphology, typically dependent upon catalyst morphology, many times is critical. Included in good polymer morphology is uniformity of particle size and shape, resistance to attrition and an acceptably high bulk density. Minimization of very small particles (fines) typically is very important, especially in gas-phase polymerization to avoid transfer or recycle line pluggage. Very large particles also must be avoided to minimize formation of lumps and strings in the reactor. A suitable catalyst should produce a polymer with minimum particles having average diameter less than 150 microns (fines) or greater than 850 microns. Depending upon the polymerization process used, at times it is desirable to use solid catalyst particles of different size distributions.

Another property which is important commercially is maintenance of an acceptably high bulk density. Typically, this property is measured in pounds per cubic foot of polymer. One approach to improve morphology control as described in U.S. Pat. No. 4,540,679 is to solubilize a magnesium species with carbon dioxide in an alcohol solvent. U.S. Pat. No. 4,612,299 describes formation of magnesium carbonates and magnesium carboxylate supports. U.S. application Ser. No. 186,359, filed Apr. 25, 1988, corresponding to EP250,230, assigned to a common assignee, discloses a titanium, magnesium, halide, organic complex polymerization catalyst.

The present invention incorporates a series of catalyst formation process steps described in U.S. Ser. No. 186,359, filed Apr. 25, 1988 which produce a catalyst with exceptionally high activity and stereospecificity combined with very good morphology with an ability to modify the particle size distribution of the resulting solid catalyst depending on its method of preparation.

Supported, magnesium-containing, titanium-containing, electron donor-containing olefin polymerization catalysts now are well known in the art. Use of carbon dioxide in preparing a magnesium-containing support has been described in the aforementioned U.S. Pat. No. 4,540,679. Also, in a different context use of carbon dioxide was described in U.S. Pat. Nos. 4,246,383; 4,244,838; 4,529,715; and 4,530,915. Treating alcoholic solutions and suspensions of alkaline earth alcoholates with sulfur dioxide was noted in Chemical Abstracts, Vol. 76, 853050v (1972). Forming a soluble magnesium species has been described in U.S. Pat. Nos. 4,315,874; 4,399,054; 4,071,674; and 4,439,540. Examples of use of silicon compounds in formation of a catalyst component include U.S. Pat. Nos. 4,071,672; 4,085,276; 4,220,554; and 4,315,835. Tetrahydrofuran (THF) has been described variously to complex a magnesium chloride species (e.g., U.S. Pat. Nos. 4,482,687, 4,277,372, 3,642,746, and 3,642,772 and in European Pat. 131,832); as a modifier in a cocatalyst (e.g., U.S. Pat. Nos. 4,158,642 and 4,148,756); and as a solvent (e.g., U.S. Pat. Nos. 4,477,639 and 4,518,706).

U.K. Patent Published Application GB 2111066 A describes an olefin polymerization catalyst component containing magnesium, titanium, halogen and an ester selected from the group consisting of esters of polycarboxylic acids and esters of polyhydroxy compounds, is obtained by contacting a liquid hydrocarbon solution of (i) a magnesium compound with (ii) a titanium compound in the liquid state to form a solid product or first preparing a liquid hydrocarbon solution of the magnesium compound (i) and the titanium compound (ii) and then forming a solid product therefrom, said reaction of forming the solid product being carried out in the presence of (D) at least one electron donor selected from the group consisting of monocarboxylic acid esters, aliphatic carboxylic acids, carboxylic acid anhydrides, ketones, aliphatic ethers, aliphatic carbonates, alkoxy group-containing alcohols, aryloxy group-containing alcohols, organic silicon compounds having an Si-O-C bond and organic phosphorus compounds having a P-O-C bond, and during or after the formation of the solid product, and contacting the solid product with (E) an ester selected from the group consisting of esters of polycarboxylic acids and esters of polyhydroxy compounds. The final catalyst in use also contains (B) an organometallic compound of a metal selected from the group consisting of metals of Groups I to III of the periodic table, and (C) an organic silicon compound having an Si-O-C bond or Si-N-C bond such as an alkylalkoxysilane.

U.S. Pat. Nos. 4,298,718, 4,476,289, 4,544,717 and 4,636,486 all are directed to a catalyst formed by reacting a titanium compound with an "active magnesium dihalide." U.S. Pat. Nos. 4,107,413, 4,107,414 and 4,336,360 are related to the catalysts previously described in U.S. Pat. Nos. 4,298,718, 4,476,289, 4,544,717, and 4,636,486 in that an element of each claim is a catalyst component formed by reacting an "activated magnesium dihalide" with titanium tetrachloride. U.S. Pat. Nos. 4,226,741 and 4,331,561 are related and are directed to a catalyst prepared by reacting a magnesium dihalide with a halogenated titanium compound and an electron donor. U.S. Pat. Nos. 4,410,589 and 4,330,649 are related and are directed to a product of (1) a magnesium compound "in the liquid state" having no reducing ability, in the presence of (2) an electron donor with no active hydrogens, with (3) a halogen-containing compound in the liquid state. U.S. Pat. No. 4,290,915 is directed to a solid titanium catalyst component containing, magnesium, titanium and halogen in which a liquid hydrocarbon is present in an amount from 1 to 10% or 1 to 25% depending on the component's "uniformity coefficient."

U.K. Patent 1,554,340 describes an olefin polymerization catalyst component formed by reacting a magnesium alkoxide, an organic electron donor and a titanium halogen compound. EP 86,643 describes an olefin polymerization catalyst component formed from a magnesium compound, a titanium compound, an electron donor such as a dialkyl phthalate. A liquid magnesium compound may be reacted with a liquid titanium compound in the presence of an electron donor and may be further reacted with a titanium compound and electron donor. The catalyst system described contains an ester of phosphorus acid with an alcohol of 2 to 4 carbon atoms. EP 86,645 describes an olefin polymerization catalyst formed from a component containing titanium, magnesium, halogen and an electron donor, an organoaluminum compound and a polyamino compound. The electron donor may be a dialkyl phthalate, diisobutyl phthalate or diethyl phthalate.

U.S. Pat. No. 4,442,276 describes an olefin polymerization catalyst component composed of a solid titanium catalyst component obtained by reacting tetravalent titanium, magnesium, halogen and an electron donor with an organosilicon compound having a Si-O-C bond. Applicants' material is not formed according to the procedure disclosed. U.S. Pat. Nos. 4,472,524, 4,473,660 and 4,522,930 described olefin polymerization catalysts formed by reacting an aluminum alkyl, an electron donor such as a silicon compound containing an Si-O-R group and a solid titanium-containing compound supported on a magnesium halide which could be formed by reacting magnesium with an alcohol or with a hydrocarboxyl halide and an alcohol or reacting a magnesium mono-or dialcohol or carbonate with a halogenating agent.

However the specific combination of steps taught in this invention to produce a catalyst with extremely advantageous properties have not been disclosed in the above-cited references.

SUMMARY OF THE INVENTION

In a solid hydrocarbon-insoluble, alpha-olefin polymerization catalyst component with superior activity, stereospecificity and morphology characteristics comprising the product formed by (A) forming a solution of a magnesium-containing species from a magnesium alkyl (or hydrocarbyl) carbonate or a magnesium carboxylate; (B) precipitating solid particles from such magnesium-containing toluene-based solvent by treatment with a transition metal halide and an organosilane; (C) reprecipitating such solid particles from a mixture containing a cyclic ether; and (D) treating the reprecipitated particles with a transition metal compound and an electron donor, the morphology of such component is modified by incorporating a morphology-affecting amount of $C_8$-$C_{10}$ aromatics within the toluene-based solvent in Step B, Step A, in Step C prior to addition of ether, or combinations thereof.

BRIEF DESCRIPTION OF THE INVENTION

The invention described herein is based on a catalyst component described in U.S. Pat. Nos. 4,540,679 and 4,612,299 and U.S. application Ser. No. 186,359 filed Apr. 25, 1988, assigned to common assignee and all incorporated by reference herein. It has been found that first forming a solid precipitate from such solubilized magnesium species with a titanium halide in the presence of an organosilane of the type $R_n SiR'_{4-n}$, wherein n=0 to 4, R=hydrogen, alkyl, alkoxy, chloroalkyl or aryl and R'=OR or Cl, produces a precipitate with a uniform particle size.

In another aspect of that invention, it had been found that the catalyst component may be improved by reprecipitating the solid precipitate formed as described above from a solution containing a cyclic ether such as tetrahydrofuran (THF). The reprecipitated solid particles have a narrow particle size distribution and form a catalyst with very high activity and stereospecificity together with high bulk density. Typical bulk densities were increased from about 25 lbs/ft$^3$ to about 28-30 lbs/ft$^3$. To form a suitable catalyst component, the reprecipitated solid described above was treated with a Ti(IV) species in the presence of an electron donor.

According to this invention, solid catalyst particle morphology is controlled by adding small, but effective, amounts of $C_8$-$C_{10}$ aromatics to a toluene-containing solvent from which the above-described support material is first precipitated or reprecipitated. In a typical procedure, a reaction solution of magnesium ethoxide, an alcohol and carbon dioxide is dissolved in a toluene solvent to which a silicon-containing compound and a titanium tetrahalide is added to precipitate a support material. The initial solvent is toluene or a mixture of toluene with up to about 30 wt. % aliphatic hydrocarbons such as Isopar G, a $C_{10}$-average isoparaffinic hydrocarbon. To such a base solvent is added a small amount of $C_8$-$C_{10}$ aromatics to affect the morphology, including particle size distribution, of the solid particulate catalyst component formed by the describe procedure. Typically, about 1000 to about 20,000 ppm by weight (0.1-2 wt. %) based on toluene of such $C_8$-$C_{10}$ aromatics are incorporated within the solvent to effect the desired morphology change. Preferably, about 2000 to about 10,000 ppm, and more preferably, about 4000 to about 8000 ppm of such $C_8$-$C_{10}$ aromatics are used. For a solvent incorporating only $C_8$ aromatics, the most preferred range is about 4000 to about 10,000 ppm.

Preferably the $C_8$-$C_{10}$ aromatics are added to the first precipitation solvent, although such aromatics may be added to the initial solution in which carbon dioxide is reacted with a magnesium compound and, optionally, may be added to the reprecipitation solvent before addition of the cyclic ether.

It has been observed that incorporation of such amount of $C_8$-$C_{10}$ aromatics narrows the particle size distribution of the final catalyst particles and, typically, decrease the median particle size. In a polymerization process, especially a gas-phase process, both catalyst fines and very large particles should be avoided. Also, catalyst and resulting polymer particle handling is benefited by uniform, smaller (~20-25 μm) particle-size material.

In this invention, the $C_8$-$C_{10}$ aromatics include o-xylene, m-xylene, p-xylene, mixed xylenes, ethylbenzene, naphthalene, cumene, pseudocumene, methylethyl benzenes, tetrahydronaphthalene, and diethylbenzenes. Ethyl benzene, ortho-xylene, meta-xylene, para-xylene and naphthalene are preferred. Mixtures of $C_8$-$C_{10}$ aromatics may be used. Naphthalene is most preferred.

According to this invention, the $C_8$-$C_{10}$ aromatics are included within the toluene-based precipitation solvent. Such $C_8$-$C_{10}$ aromatics also may be present in toluene-based solvents used in other steps of catalyst preparation.

Catalyst components of this invention may be prepared by precipitating a first solid material from a hydrocarbon medium by treating a magnesium hydrocarbyl carbonate or carboxylate composition with a transition metal compound, preferably in the presence of an organosilane compound. The first precipitated solid is reprecipitated from a medium containing a cyclic ether such as tetrahydrofuran (THF) to form uniform solid particles. The resulting particles are retreated with a suitable Ti(IV) compound and a suitable electron donor to form an olefin polymerization catalyst component. Such component may be combined with a suitable aluminum alkyl compound together with suitable modifier compounds to form a catalyst system useful to polymerize olefins, especially propylene. Using the catalyst of this invention, polymer particles with a narrow particle size distribution in high yield and stereospecificity may be obtained.

In one aspect of this invention, a soluble magnesium-containing species is formed. Soluble magnesium hydrocarbyl carbonates and carboxylates useful in this invention include those described in U.S. Pat. Nos. 4,540,679 and 4,612,299 and U.S. application Ser. No. 186,359, filed Apr. 25, 1988, assigned to a common assignee, all incorporated by reference herein. Typically, magnesium hydrocarbyl carbonate solutions are formed in a suitable diluent by treating a magnesium compound with carbon dioxide, preferably in the presence of a suitable solvating agent such as an alcohol. For example, magnesium hydrocarbyl carbonate solutions can be formed by suspending magnesium alkoxide, such as magnesium ethoxide, in an alcohol medium and adding carbon dioxide until the magnesium ethoxide dissolves to form magnesium ethyl carbonate species. Also, magnesium alkoxide solution with an alcohol can be used.

In inert suspending medium the magnesium hydrocarbyl alcoholates are converted into magnesium hydrocarbyl carbonate salts on the addition of carbon dioxide. Spherical forms of magnesium alkoxides can be used, if desired, particularly when an alcoholic medium is not employed for the carbonation step. Reaction of a magnesium alcoholate compound with carbon dioxide can be represented as follows:

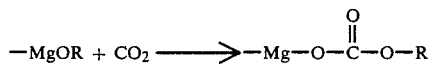

where R is a hydrocarbyl group of 1 to 20 carbon atoms.

Alternatively, a solution of a magnesium hydrocarbyl compound with carbon dioxide may be used in this invention. Reaction of a magnesium hydrocarbyl compound with carbon dioxide to form a magnesium hydrocarbyl carboxylate can be represented as follows:

where R is a hydrocarbyl group of 1 to 20 carbon atoms. It has been found that sulfur dioxide can be substituted for carbon dioxide in forming solubilized magnesium compounds. Hydrocarbyl magnesium compounds useful in this invention have the structure R-Mg-Q wherein Q is hydrogen, halogen or R' (each R' is independently a hydrocarbyl group of 1 to 20 carbon atoms.) Dihydrocarbyl magnesium compounds preferred for use in this invention are those of the formula Mg(R')$_2$ wherein R' is as defined above. In terms of catalytic activity and stereospecificity, best results are achieved through the use of hydrocarbyl magnesium halide compounds of the formula Mg(R')Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide. Preferably, suitable magnesium compounds are free of magnesium hydroxide and magnesium carbonate impurities.

Alcohols useful in solvating magnesium hydrocarbyl carbonate and carboxylates include those having the structure HOR' wherein R' is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used such as methanol, ethanol, propanol, isopropanol, tert-butyl alcohol, cyclohexanol, 2-ethylhexanol, dodecanol, and the like. Of these, 2-ethyl-1-hexanol is preferred.

In another aspect of this invention, a magnesium hydrocarbyl carbonate or carboxylate solution is treated with a transition metal halide, preferably a titanium(IV) halide to precipitate a first solid component. Titanium tetrachloride is most preferred. Preferably, such treatment is performed in a toluene-based diluent and preferably in the presence of an organosilane.

It has been found that incorporation of suitable organosilanes is useful in preparing solid catalyst components with acceptable morphology, i.e., with particle distributions not containing excessive amounts of fines or large particles. Suitable organosilanes useful as reagents in precipitating a solid from a soluble magnesium species according to this invention have a formula: $R_nSiR'_{4-n}$, wherein n=0 to 4 and wherein R is hydrogen or an alkyl, alkoxy, haloalkyl or aryl radical containing one to about ten carbon atoms or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an -OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane and tetraethoxysilane.

In preparation of the stereospecific supported catalyst components of this invention, typically, the soluble magnesium-containing species, titanium(IV) halide component and organosilane component are contacted in amounts such that the atomic ratio of magnesium to titanium is at least about 0.3:1 and preferably, is from about 0.4:1 to about 20:1 and more preferably, from about 0.5:1 to about 3:1. The Si/Ti atomic ratio typically can range from about 0.1:1 to about 2.0:1 and preferably is about 0.3:1 to about 1:1.

In another aspect of this invention, the first precipitated solid is reprecipitated from a solution containing a cyclic ether. In a typical reprecipitation procedure, the first solid is entirely solubilized in the cyclic ether solvent and then solid is allowed to reprecipitate to form particles of uniform size. The preferable ether is tetrahydrofuran, although other suitable cyclic ethers, such as tetrahydropyran and 2-methyltetrahydrofuran, may be used, which can solubilize the first solid material. Also, thioethers such as tetrahydrothiophene can be used. In some instances, such as the use of 2,2,5,5-tetramethyltetrahydrofuran and tetrahydropyran-2-methanol, reprecipitation occurs upon heating to about 130°-185° F. Other compounds may be used which act in an equivalent manner, i.e., materials which can solubilize the first solid and from which solid uniform particles can be reprecipitated, such as cyclohexene oxide, cyclohexanone, ethyl acetate and phenyl acetate. Mixtures of suitable materials may be used.

In another aspect of this invention, the reprecipitated solid is treated with a titanium(IV) compound in the presence of a suitable electron donor. In one procedure a two-step method is used in which the reprecipitated solid is treated first with a Ti(IV) component and then with the Ti(IV) component combined with a suitable electron donor. Although, typically, solid is separated from the first Ti(IV)-containing solution before a second treatment with Ti(IV) component and electron donor, an alternative procedure can be to react the reprecipitated solid with Ti(IV) compound and then add the electron donor.

Also, this treatment can be performed in a one-step procedure in which the precipitated controlled morphology support is agitated with a suitable solvent such as chlorobenzene and $TiCl_4$, followed by addition, without decantation, of chlorobenzene, $TiCl_4$ and an electron donor, followed by more chlorobenzene, before separating, washing and drying.

Organic electron donors useful in preparation of stereospecific supported catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

The preferred electron donor compounds include esters of aromatic acids. Preferred organic electron donors according to this invention are $C_1-C_6$ alkyl esters of aromatic mono- and dicarboxylic acids and halogen-, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from two to about ten carbon atoms. Examples of preferred phthalate ester are diisobutylphthalate, diethylphthalate, ethylbutylphthalate, di-t-butylphthlate, and di-n-butylphthalate, and mixtures thereof.

Titanium(IV) compounds useful in treating the reprecipitated solid particles of this invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Titanium tetrahalides, particularly titanium tetrachloride ($TiCl_4$), are most preferred.

The electron donor component used in preparation of the solid catalyst component is used in an amount ranging from about 0.001 to about 1.0 mole per gram atom of titanium, and preferably from about 0.005 to about 0.8 mole per gram atom. Best results are achieved when this ratio ranges from about 0.01 to about 0.6 mole per gram atom of titanium.

Typical suitable diluents useful in this invention are aromatic or substituted aromatic liquids, although other hydrocarbon-based liquids may be used. Aromatic hydrocarbons, such as toluene, and substituted aromatics, such as chlorobenzene, have been found suitable. Another suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G which is a $C_{10}$-average isoparaffinic hydrocarbon boiling at 156°–176° C. A suitable diluent should boil at a high enough temperature to promote reaction and not adversely affect resulting catalyst performance.

Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

In a preferred process, solvents from the treatment steps may be recycled to other parts of the process. Thus, supernatant and filtrates may be recycled, typically after removal of solids, either to other treatment steps in which a hydrocarbon solvent and $TiCl_4$ are present or in a closed loop to the same treatment step. Such recycling is beneficial in minimizing waste product. It is possible to treat a recycled stream containing a $TiCl_4.THF$ or other complex with a phthalate to yield a $TiCl_4.$phthalate complex which can be used in a treatment step.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 2 to about 3 wt. % titanium, from about 15 to about 21 wt. % magnesium and from about 55 to about 65 wt. % chlorine.

One unusual aspect of the titanium-containing component particles prepared according to the preferred method of this invention is that the particles have a cubic shape.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, incorporated herein by reference.

The titanium-containing catalyst component of this invention is used in a polymerization catalyst containing a cocatalyst component including a Group II or III metal alkyl and, typically, one or more modifier compounds.

Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethyalauminum sesquichloride, diisobutylaluminum hydride, and the like.

A typical catalyst composition is formed by combining the supported titanium-containing compound described in this invention and an alkyl aluminum compound together with modifiers including an electron donor and, preferably, a silane. Typically, useful aluminum-to-titanium atomic ratios in such catalyst formulations are about 10 to about 500 and preferably about 30 to about 300. Typical aluminum compound-to-electron donor molar ratios are about 5 to about 40. Typical aluminum-to-silane compound molar ratios are about 8 to about 30.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid, and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization cocatalyst useful in this invention advantageously contains an aliphatic or aromatic silane modifier. Preferable silanes useful in cocatalysts in this invention include alkyl-, aryl-, and/or alkoxy-substituted silanes containing hydrocarbon moieties with one to about 20 carbon atoms. Especially preferred are silanes having a formula: $SiR_4$, wherein R is independently R' or OR' with R' having 1 to about 20 carbon atoms. Preferred aromatic silanes include diphenyldimethoxysilane, phenyltrimethoxysilane, phenylethyldimethoxysilane and methylphenyldimethoxysilane. Preferred aliphatic silanes include isobutyltrimethoxysilane, diisobutyldimethoxysilane, diisopropyldimethoxysilane, di-t-butyldimethoxysilane, and t-butyltrimethoxysilane. A preferred system is described in U.S. application Ser. No. 875,185 filed Jun. 17, 1986, assigned to a common assignee and incorporated by reference herein.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.02 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, the system pressure cannot be below the partial pressure of the alpha-olefin to be polymerized at the polymerization temperature.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propylbenzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems and are described in U.S. Pat. Nos. 3,957,448; 3,965,083; 3,971,768; 3,970,611; 4,129,701; 4,101,289; 3,652,527; and 4,003,712, all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

EXAMPLES 1-8

The invention described herein illustrated, but not limited, by the following Examples and Comparative Runs.

One series of catalyst components was prepared using the following general procedure:

Step A—Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1530 milliliters. The solution contained 0.10 gram-equivalents of magnesium ethoxide per milliliter.

Step B—Formation of Solid Particles

Into a one-liter reactor was charged 170 milliliters of toluene, 20.5 milliliters of tetraethoxysilane, 19.4 of milliliters titanium tetrachloride and 35 milliliters of Isopar G (a $C_{10}$-average isoparaffinic hydrocarbon, b.p. 156°-176° C.) under a blanket of dry nitrogen. After the mixture was stirred at 600 rpm at 26°-30° C. for 15 minutes, 114 milliliters of the Step A magnesium hydrocarbyl carbonate solution were added to the reactor through a syringe. Solid particles precipitated.

the effect of such addition. Results are shown in the following Table I.

TABLE I

| $C_8-C_{10}$ Content[1,2] | Examples and Comparative Run | | | | | | | | |
|---|---|---|---|---|---|---|---|---|---|
| | Run A | 1 | 2 | 3 | 4 | 5 | 6 | 7 | 8 |
| EB | 66 | 1180 | 1500 | 1500 | 800 | 800 | 777 | 810 | 60 |
| p-X | 22 | 820 | 400 | 1500 | 400 | 1500 | 437 | 480 | 20 |
| m-X | 29 | 2220 | 900 | 900 | 3000 | 3000 | 878 | 950 | 30 |
| o-X | 0 | 800 | 1500 | 200 | 1500 | 200 | 199 | 200 | 0 |
| Naphth. | 0 | 0 | 0 | 0 | 0 | 0 | 0 | 5080 | 5000 |
| Particle Size $(\mu m)$[3] | | | | | | | | | |
| <12 | 8.3 | 9.7 | 8.3 | 7.3 | 10.9 | 7.0 | 8.2 | 7.6 | 8.2 |
| 16 | 2.9 | 0.0 | 0.0 | 9.3 | 0.0 | 7.8 | 1.0 | 13.0 | 18.3 |
| 24 | 30.6 | 49.8 | 38.8 | 38.2 | 40.1 | 39.3 | 38.4 | 52.9 | 47.7 |
| 32 | 26.2 | 32.6 | 34.6 | 20.6 | 38.4 | 22.7 | 20.6 | 24.6 | 22.6 |
| 48 | 26.6 | 7.9 | 18.3 | 18.0 | 10.2 | 19.0 | 31.8 | 1.6 | 0.0 |
| >48 | 5.4 | 0.0 | 0.0 | 6.6 | 0.4 | 4.2 | 0.0 | 0.3 | 3.2 |
| D(10%)[4] | 15.1 | 16.3 | 17.1 | 14.1 | 7.3 | 14.4 | 16.4 | 13.6 | 13.0 |
| D(50%)[4] | 26.2 | 22.6 | 24.5 | 22.8 | 23.8 | 23.0 | 24.7 | 20.3 | 19.7 |
| D(90%)[4] | 43.0 | 31.0 | 35.2 | 43.5 | 32.3 | 40.9 | 38.9 | 27.8 | 27.8 |
| Broadness[5] | 21.3 | 13.0 | 14.8 | 25.8 | 21.0 | 23.0 | 18.2 | 14.0 | 15.0 |

[1] $C_8-C_{10}$ content measured by gas chromatography (ppm to toluene).
[2] o-X = ortho-xylene; m-X = meta-xylene; p-X = para-xylene; EB = ethylbenzene Naphth = naphthalene
[3] Diameter of particles, using laser light scattering assuming spherical geometry.
[4] Diameter of particles in the 10.0, 50.0, and 90.0 percentile, respectively
[5] Broadness = [D(90%) − D(10%) $\mu$m](20 $\mu$m)/D(50%)$\mu$m

Step C—Reprecipitation of Solid Particles

After the mixture containing the precipitate was stirred for five additional minutes, 50 of milliliters tetrahydrofuran (THF) were added rapidly through a syringe. Thereupon, the stirring was maintained at 600 rpm and the temperature rose to 60° C. within 15 minutes. The first formed solid dissolved in the THF solution. Within about ten minutes after the THF addition, a solid began to reprecipitate from solution. Stirring was continued for 1 hour at 60° C. after which agitation was stopped and the resulting solid was allowed to settle. Supernatant was decanted and the solid washed twice with 50-milliliter portions of toluene.

Step D—Titanium (IV) Compound Treatment

To the solid from Step C in the one-liter reactor were added 125 milliliters of toluene and 50 milliliters of titanium tetrachloride. The resulting mixture was heated to 235° F. within 30 minutes and stirred at 800 rpm for one hour. After stirring was stopped, the resulting solid was allowed to settle and the supernatant was decanted. After 150 milliliters of toluene, 50 milliliters of titanium tetrachloride and 3 milliliters of di-n-butylphthalate were added to the resulting solid, the mixture was stirred at 800 rpm at 135° C. for 90 minutes, the solid was allowed to settle and supernatant liquid was decanted. After 95 milliliters of toluene were added, the mixture was heated to 195° F. for 30 minutes. After the agitation was stopped, the solid was allowed to settle and the supernatant decanted. An additional 125 milliliters of titanium tetrachloride was added, the mixture heated at 195° F. under agitation for 30 minutes, after which the agitation was stopped, and the supernatant liquid was decanted. The residue washed five times with 50-milliliter portions of hexane and the solids recovered.

In this series, the catalyst components were prepared incorporating small amounts of $C_8-C_{10}$ aromatics in the toluene-based precipitation solvent in Step B as well as incorporating the same amounts of $C_8$ aromatics in the toluene-based solvent used in Step A. The particle size of the resulting material was measured to demonstrate

EXAMPLES 9-24

Another series of catalyst components was prepared using a second general procedure:

Step A—Formation of Magnesium Hydrocarbyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1523 milliliters. The solution contained 0.10 gram-equivalents of magnesium ethoxide per milliliter.

The toluene used in this procedure as an option may contain C8-C10 aromatic compounds.

Step B—Formation of Solid Particles

Into a one-liter reactor was charged 150 milliliters of toluene (containing the appropriate levels of $C_8-C_{10}$ aromatic compounds), 20.5 milliliters Si(OEt)$_4$, and 14 milliliters TiCl$_4$ under a blanket of dry nitrogen. After the mixture was stirred at a speed between 500 and 650 rpm at 26°-30° C. for 15 minutes, 114 milliliters of the Step A magnesium alkyl carbonate solution were added to the reactor through a syringe. Solid particles precipitated from the solution.

Step C—Reprecipitation

After the mixture containing the precipitate was stirred for an additional five minutes, 27 milliliters THF were added rapidly through a syringe. Thereupon, the stirring was maintained at the speed established in Step B and the temperature was raised to 57°±3° C. The Step B solid dissolved in the THF solution. Within about ten minutes after the THF addition, a solid began to reprecipitate from solution. Stirring was continued for 1 hour at 60° C. after which agitation was stopped and the resulting solid was allowed to settle. Supernatant was decanted and the solid washed twice with 50-milliliter portions of toluene.

Step D—Titanium (IV) Compound Treatment

To the solid from Step C in the one-liter reactor were added 125 milliliters of toluene and 50 milliliters of titanium tetrachloride. The resulting mixture was heated to 235° F. within 30 minutes and stirred at 800 rpm for one hour. After stirring was stopped, the resulting solid was allowed to settle and the supernatant was decanted. After 150 milliliters of toluene, 50 milliliters of titanium tetrachloride and 2.4 milliliters of di-n-butylphthalate were added to the resulting solid, the mixture was stirred at 800 rpm at 135° C. for 90 minutes, then the solid was allowed to settle and the supernatant liquid was decanted. After 95 milliliters of toluene were added, the mixture was heated to 195° C. for 30 minutes. After the agitation was stopped, the solid was allowed to settle and the supernatant decanted. An additional 125 milliliters $TiCl_4$ was added, the mixture heated at 90° C. under agitation for 30 minutes, after which the agitation was stopped, the solid settled and the supernatant liquid was decanted. The residue was washed five times with 50-milliliter portions of hexane and the solids recovered.

In this series, the catalyst components were prepared incorporating small amounts of the naphthalene in the toluene-based precipitation solvent in Step B or, as demonstrated in examples 15 and 16, by addition of like amounts of naphthalene after the completion of Step B or to the magnesium hydrocarbyl carbonate solution, respectively. The particle sizes of the resulting materials were measured and the results are shown in Table II. This series shows the particle size distribution (PSD) narrows with the use of naphthalene from about 2000 to about 12,000 ppm, with the preferred effect seen between 2500 and 8200 ppm. Naphthalene at the 1000 ppm level appears not to be advantageous versus pure toluene with respect to forming narrower PSD.

TABLE II

| Ex. (Run) | Naphthalene Added (mg) | Corresponding Naphthalene Level (ppm) | D(10%)[1] (μm) | D(50%)[1] (μm) | D(90%)[1] (μm) | Broadness[2] (μm) |
|---|---|---|---|---|---|---|
| (B) | 0 | 0 | 6.8 | 22.4 | 30.9 | 21.5 |
| (C) | 0 | 0 | 5.4 | 20.6 | 27.6 | 21.6 |
| 9 | 130 | 1000 | 6.9 | 24.3 | 33.0 | 21.5 |
| 10 | 130 | 1000 | 9.9 | 21.0 | 37.6 | 26.4 |
| 11 | 260 | 2000 | 6.3 | 20.9 | 28.1 | 20.9 |
| 12 | 320 | 2500 | 17.2 | 26.4 | 37.9 | 15.7 |
| 13 | 650 | 5000 | 17.0 | 24.8 | 37.0 | 16.1 |
| 14 | 650 | 5000 | 17.0 | 22.6 | 32.9 | 14.1 |
| 15 | 650 | 5000 | 16.9 | 25.5 | 37.8 | 16.4 |
| 16 | 650 | 5000 | 11.1 | 17.4 | 26.4 | 17.6 |
| 17 | 780 | 6000 | 17.8 | 27.2 | 38.6 | 15.3 |
| 18 | 980 | 7500 | 13.1 | 19.2 | 26.1 | 13.5 |
| 19 | 980 | 7500 | 16.5 | 25.0 | 37.8 | 17.0 |
| 20 | 1050 | 8200 | 12.2 | 18.4 | 26.2 | 15.2 |
| 21 | 1300 | 10000 | 16.4 | 24.1 | 40.1 | 19.7 |
| 22 | 1300 | 10000 | 14.3 | 21.5 | 28.9 | 13.6 |
| 23 | 1560 | 12000 | 13.2 | 21.2 | 33.6 | 19.2 |
| 24 | 1950 | 15000 | 5.9 | 21.2 | 34.6 | 27.1 |

[1] Diameter of particles in 10.0, 50.0, and 90.0 percentile, respectively.
[2] $Broadness = \frac{\{D(90\%) - D(10\%)\mu m\}(20 \mu m)}{D(50\%)\mu m}$ That which is claimed is:

1. A solid, hydrocarbon-insoluble alpha-olefin polymerization catalyst component comprises a product formed by:

A. Forming a solution of a magnesium-containing species from a magnesium hydrocarbyl carbonate or a magnesium carboxylate;
B. Precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen;
C. Reprecipitating such solid particles from a solution containing a cyclic ether; and
D. Treating the reprecipitated particles with a transition metal compound and an electron donor;

in which at least one solution in Steps A, B or C is a toluene-based solution containing about 0.1 to about 2 wt. % $C_8$–$C_{10}$ aromatic hydrocarbon.

2. The catalyst component of claim 1 wherein the $C_8$–$C_{10}$ aromatic hydrocarbon is incorporated into a toluene-based solution in Step A and B.

3. The catalyst component of claim 1 wherein the $C_8$–$C_{10}$ aromatic hydrocarbon is incorporated into a toluene-based solution in Step B.

4. The catalyst component of claim 1 wherein the $C_8$–$C_{10}$ aromatic hydrocarbon is o-xylene, m-xylene, p-xylene, ethylbenzene, naphthalene or mixtures thereof.

5. The catalyst component of claim 1 wherein the $C_8$–$C_{10}$ aromatic hydrocarbon is naphthalene.

6. The catalyst component of claim 1 wherein the $C_8$–$C_{10}$ aromatic hydrocarbon is o-xylene, m-xylene, p-xylene, ethylbenzene or mixtures thereof.

7. The catalyst component of claim 1 wherein the toluene-based solvent contains about 0.2 to about 1 wt. % $C_8$–$C_{10}$ aromatic hydrocarbon.

8. The catalyst component of claim 1 wherein the toluene-based solvent contains about 0.2 to about 0.8 wt. % naphthalene.

9. The catalyst component of claim 1 wherein the toluene-based solvent contains about 0.4 to about 1 wt. % $C_8$–$C_{10}$ aromatic hydrocarbon.

10. The catalyst component of claim 1 wherein the magnesium hydrocarbyl carbonate solution is formed from a magnesium alkoxide and carbon dioxide.

11. The catalyst component of claim 1 wherein the transition metal halide in Step B is a titanium tetrachloride, the transition metal compound in Step D is a titanium tetrachloride, and the electron donor in Step D is a dialkylphthalate ester.

12. The catalyst component of claim 1 wherein the organosilane is trimethylchlorosilane, trimethylethoxysilane, dimethyldichlorosilane or tetraethoxysilane and cyclic ether is tetrahydrofuran, tetrahydropyran or 2-methyltetrahydrofuran.

13. The catalyst component of claim 1 wherein the cyclic ether is tetrahydrofuran.

14. The catalyst component of claim 1 wherein the electron donor in Step D is diisobutylphthalate, diethylphthalate, di-t-butylphthalate, or di-n-butylphthalate.

15. A solid, hydrocarbon-insoluble alpha-olefin polymerization catalyst component comprises a product formed by:
   A. Forming a solution in an alcohol medium of a magnesium-containing species formed from magnesium ethoxide and carbon dioxide.
   B. Precipitating solid particles from such magnesium-containing solution by treatment with titanium tetrachloride and trimethylchlorosilane, trimethylethoxysilane, dimethyldichlorosilane or tetraethoxysilane in a toluene-based solvent containing about 0.1 to about 2 wt. % $C_8$–$C_{10}$ aromatic hydrocarbon;
   C. Reprecipitating such solid particles from a mixture containing tetrahydrofuran, tetrahydropyran or 2-methyltetrahydrofuran; and
   D. Treating the reprecipitated particles with titanium tetrachloride and a dialkylphthalate ester.

16. The catalyst component of claim 15 wherein the $C_8$–$C_{10}$ aromatic hydrocarbon is o-xylene, m-xylene, p-xylene, ethylbenzene, naphthalene or mixtures thereof.

17. The catalyst component of claim 15 wherein the $C_8$–$C_{10}$ aromatic hydrocarbon is naphthalene.

18. The catalyst component of claim 15 wherein the $C_8$–$C_{10}$ aromatic hydrocarbon is o-xylene, m-xylene, p-xylene, ethylbenzene or mixtures thereof.

19. The catalyst component of claim 15 wherein the toluene-based solvent contains about 0.2 to about 1 wt. % $C_8$–$C_{10}$ aromatic hydrocarbon.

20. The catalyst component of claim 15 wherein the toluene-based solvent contains about 0.2 to about 0.8 wt. % naphthalene.

* * * * *